Sept. 3, 1929.  B. STOCKFLETH ET AL  1,726,996
SHOP TRACTOR
Filed April 29, 1926
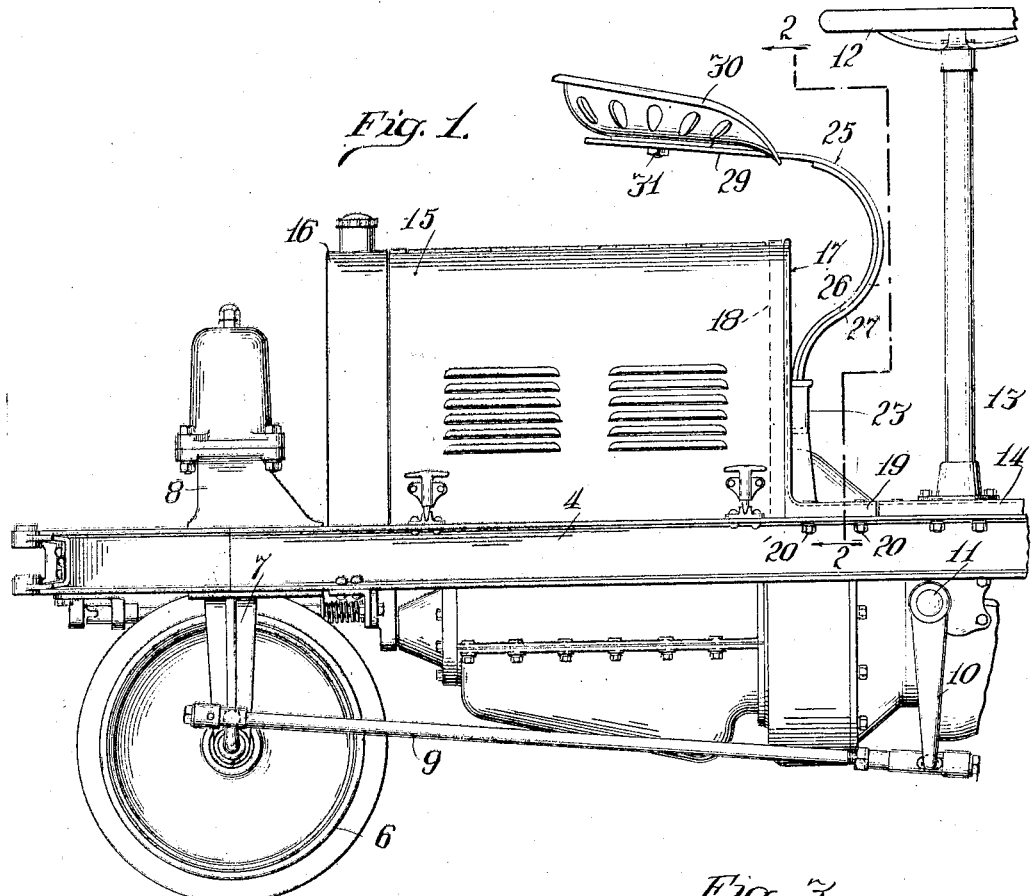
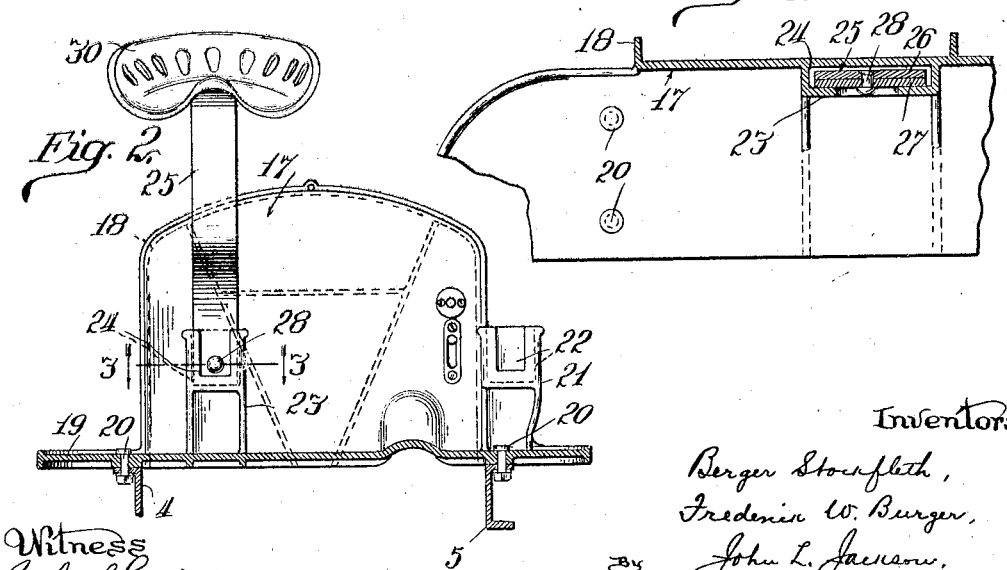

Patented Sept. 3, 1929.

1,726,996

UNITED STATES PATENT OFFICE.

BERGER STOCKFLETH, OF BERRIEN SPRINGS, AND FREDERICK W. BURGER, OF NILES, MICHIGAN, ASSIGNORS TO CLARK TRUCTRACTOR COMPANY, OF BUCHANAN, MICHIGAN, A CORPORATION OF MICHIGAN.

SHOP TRACTOR.

Application filed April 29, 1926. Serial No. 105,446.

Our invention relates to shop tractors of the type shown and described in Letters Patent of Robert J. Burrows, No. 1,390,757, dated September 13, 1921, comprising a frame supported at the front on propelling wheels and at the rear on a steering wheel of the caster type, the load carrying platform or bed being at the front over the propelling wheels, while the motor by which such wheels are driven is at the rear, the driver's seat and the steering post being located between the load carrying platform and the motor.

In such shop tractors it is desirable that the wheel base be as short as possible so that the vehicle can make sharp turns and be maneuvered through narrow and more or less tortuous aisles, and, therefore, it is necessary that space be economized to the greatest possible extent. To that end in the tractor shown and described in said Burrows patent the operator's seat was placed upon the hood enclosing the motor, but that arrangement is objectionable for various reasons, and besides it is not one that lends itself to the accommodation of two persons, and frequently it is desirable that a helper accompany the operator and that a seat be provided for him.

The principal object of our present invention is to provide an improved construction by which the objections to placing the operator's seat on the hood will be avoided without sacrificing economy of space, and also to make provision by which when desired two seats may be provided. Another object is to so construct the seat support that the seat or seats may readily be removed or replaced, and the seat support itself will serve as a dash board for supporting one end of the hood and such instruments as may be required, and also as a floor board or covering for a part of the motor frame, thereby simplifying the construction and at the same time providing a very strong and stable support for the seat or seats that does not materially reduce the space allowed for the operator's station. These objects we accomplish as illustrated in the drawings and hereinafter described. What we regard as new is set forth in the claims.

In the accompanying drawings,—

Fig. 1 is a side elevation of the rear portion of a shop tractor of the type above referred to, having our improvements incorporated therein;

Fig. 2 is a partial vertical section on line 2—2 of Fig. 1; and

Fig. 3 is an enlarged detail, being a horizontal section on line 3—3 of Fig. 2.

Referring to the drawings,—4, 5 indicate the side members of the frame of the tractor, which are preferably channel bars, as shown in Fig. 2. At the rear of said frame is a caster wheel 6 mounted in a yoke 7 swiveled to turn about a vertical axis in a housing 8 mounted on the frame, said caster wheel being connected by a steering rod 9 with a crank 10 carried by a transverse shaft 11 located approximately midway of the length of the frame and arranged to be rocked by any suitable connections by rotation of a hand steering wheel 12 mounted at the upper end of a steering post 13 rising from one of the floor boards 14. The steering post 13 is located between the load carrying means, such as a platform or bed (not shown) at the front of the tractor, and the motor, which is enclosed in a hood 15, the motor being mounted on the rear portion of the frame. At the rear end of the hood 15 is a radiator 16, and at the front end of said hood is a dash and instrument board 17 which is provided with a rearwardly extending flange 18, indicated by dotted lines in Fig. 1, that is overlapped by and serves as a support for the forward margin of the hood.

The dash board 17 is in the form of an L-shaped casting, the upright portion of which forms the dash board proper while the base 19 thereof extends forward from its lower marginal portion and serves as a part of the floor board or deck that covers the intermediate portion of the frame between the motor and the load carrying bed. Said base is secured to the frame in any suitable way, as by bolts 20, so that it may readily be removed as occasion requires, and, as best shown in Fig. 2, it projects laterally beyond the side members 4, 5 of the frame. At one side the dash board is provided with an integral bracket 21 the upper portion of which is in the form of a pocket 22 open at its upper end to receive the lower end of a seat spring, the arrangement being such that said seat spring projects laterally beyond one of the side margins of the dash board. Adjacent to the other side margin of the dash board, but located inside of such margin, is another bracket 23 similar to the bracket 21, and provided with a pocket 24 adapted to receive the lower end of a seat spring 25. The two seat springs are alike in design, and they are each preferably composed of two spring members 26, 27 connected at their lower ends by a bolt 28, their upper ends being curved forward and then rearwardly, as shown in Fig. 1, with the member 27 extending beyond the upper end of the member 26, as shown at 29 in Fig. 1. The portion 29 extends fore and aft in an approximately horizontal plane and carries a seat 30 secured thereto by a bolt 31, as shown in Figs. 1 and 2. Preferably the bolt passes through a longitudinal slot in the portion 29 so that the seat may be adjusted fore and aft. The arrangement is such that the seat is supported high enough above the hood so that bouncing will not cause the operator to strike the hood. One of the seats is, of course, arranged back of the steering post 13 so that its occupant can conveniently steer the tractor.

By the construction described we provide a dash board, or instrument board, which not only forms a closure for one end of the hood as is customary, but also serves as a floor board, and as a seat support adapted to carry one or more seat springs in such manner that the space between the motor and the load carrying bed or box may be made quite narrow, with consequent reduction in the length of wheel base necessary, without cramping the occupants of the seats or interfering with the operation of the clutch and other levers such as are usually provided. The operator has plenty of leg room, owing to his being seated at a point over the hood, and to the fact that the seat springs are so located as to be out of the way. The seats are held high enough above the hood so that its sides can be lifted for casual inspection of the motor without removing the seats, but they can be removed easily when necessary. The horizontal portion 19 of the plate 17 not only serves as a floor board, as above stated, but also provides a very secure connection for said plate with the frame, by which it is held in its proper position notwithstanding the strains to which it is subjected on account of the weight of those occupying the seats.

What we claim as our invention and desire to secure by Letters Patent, is—

1. In a shop tractor, the combination of a frame supported on propelling and steering wheels, a motor mounted on the rear portion of said frame, a hood enclosing said motor, a dash board at the forward end of said hood and having a horizontal portion secured to the frame, a pocket carried at the front face of said dash board and open at its upper end, a seat spring fitting at its lower end in said pocket, the upper end of said spring extending upwardly in front of the dashboard and rearwardly over the hood, a seat mounted on said spring over and spaced from the hood, means adjacent to said seat for steering the truck, and load carrying means mounted on the forward portion of said frame.

2. In a shop tractor, the combination of a frame supported on propelling and steering wheels, a motor mounted on the rear portion of said frame, a hood enclosing said motor, a dash board at the forward end of said hood and secured to the frame, a plurality of pockets at the front face of said dash board adjacent to its opposite side margins, said pockets being open at their upper ends to receive the lower ends of vertically extending seat carrying springs, the upper end portions of said springs extending rearwardly of the dash board, means at the front of the dash board operable to steer the truck, and load carrying means mounted on the front portion of said frame.

3. In a shop tractor, the combination of a frame supported on propelling and steering wheels, a motor mounted on the rear portion of said frame, a hood enclosing said motor, an L-shaped dash board comprising vertical and horizontal portions, the horizontal portion thereof being adapted to be secured to the frame, and the vertical portion thereof forming a support for the front end of the hood, a pocket at the front face of the dash board, said pocket being open at its upper end, a seat carrying spring fitted at its lower end in said pocket and extending upwardly in front of the dash board and rearwardly over the hood, a seat supported by said spring over and spaced from the hood, means in front of the dash board operable to steer the truck, and load carrying means mounted on the front portion of said frame.

4. In a shop tractor, the combination of a frame supported on propelling and steering wheels, a motor mounted on the rear portion of said frame, a hood enclosing said motor, an L-shaped dash board comprising vertical and horizontal portions, the horizontal portion thereof being adapted to be secured to the frame and extending out beyond the side margins thereof, the vertical portion of said dash board forming a support for the front end of the hood, pockets at the front of said dash board, one of said pockets extending laterally beyond a side margin thereof and connected with the horizontal portion thereof, said pockets being adapted to receive the lower ends of seat carrying springs, means in front of the dash board operable to steer the truck, and load carrying means mounted on the front portion of the truck.

5. In a shop tractor, the combination of a frame supported on propelling and steering wheels, a motor mounted on the rear portion of said frame, a hood enclosing said motor, a dash board at the forward end of said hood and secured to the frame, a seat supporting spring mounted at its lower end on the dash board and extending upwardly in front thereof and rearwardly over the hood, a seat supported by said spring above and spaced from the hood so that said seat does not interfere with the opening or raising of said hood, means adjacent to said seat for steering the truck, and load carrying means mounted on the forward portion of said frame.

BERGER STOCKFLETH.
FREDERICK W. BURGER.